United States Patent
Lydan et al.

(10) Patent No.: US 6,722,730 B2
(45) Date of Patent: Apr. 20, 2004

(54) METHOD OF ATTACHING A CLADDING TO A VEHICLE

(75) Inventors: Robert Christopher Lydan, Cambridge (CA); Ronald A. Mueller, Rochester Hills, MI (US); Amell A. Kapadia, Clawson, MI (US)

(73) Assignee: Decoma Exterior Trim Inc., Concord (CA)

( * ) Notice: Subject to any disclaimer, the term of this patent is extended or adjusted under 35 U.S.C. 154(b) by 0 days.

(21) Appl. No.: 10/311,989

(22) PCT Filed: Jun. 15, 2001

(86) PCT No.: PCT/CA01/00921
§ 371 (c)(1),
(2), (4) Date: Dec. 19, 2002

(87) PCT Pub. No.: WO01/98133
PCT Pub. Date: Dec. 27, 2001

(65) Prior Publication Data
US 2003/0102693 A1 Jun. 5, 2003

(51) Int. Cl.[7] .............................................. B62D 29/00
(52) U.S. Cl. ........................ 296/191; 296/1.08; 296/29; 52/716.6
(58) Field of Search ........................... 296/191, 29, 30, 296/193.04, 1.08; 52/716.6, 800.1, 800.11, 800.12

(56) References Cited

U.S. PATENT DOCUMENTS

| 3,580,628 A | * | 5/1971 | Rantala | 296/209 |
|---|---|---|---|---|
| 4,398,984 A | * | 8/1983 | Uchiyama et al. | 156/196 |
| 4,529,244 A | | 7/1985 | Zaydel | |
| 4,564,232 A | * | 1/1986 | Fujimori et al. | 296/146.5 |
| 4,973,102 A | | 11/1990 | Bien | |
| 5,353,571 A | * | 10/1994 | Berdan et al. | 52/716.5 |
| 6,095,594 A | * | 8/2000 | Riddle et al. | 296/191 |
| 6,318,045 B1 | * | 11/2001 | Kress | 52/716.6 |
| 2002/0043041 A1 | * | 4/2002 | Yoyasu | 52/716.5 |

* cited by examiner

Primary Examiner—Patricia Engle
(74) Attorney, Agent, or Firm—Clark Hill PLC

(57) ABSTRACT

A mounting method for mounting a plastic panel (12) to a vehicle substrate provides a support flange (24) on an inner surface of the panel. A reference nodule (28) is positioned on the inner surface of the panel. An elongate bracket (14) has an upper edge (34) thereof engaging the support flange (24). The bracket (14) has a reference notch (40) engaging the reference nodule (28) positioning the bracket (14) relative to the panel (12). A plurality of retainers (18) are mounted on the bracket (14). A double-sided adhesive tape (16) has a first adhesive on a first side thereof compatible for adhesion to the bracket (14) and a second adhesive on a second side thereof compatible for adhesion to the panel (12). The first side of the adhesive tape (16) is applied to the bracket (14) and the second side is applied to the panel (12). The tape (16) allows expansion and contraction movement of the panel (12) while securely retaining the panel (12) to the vehicle substrate.

13 Claims, 2 Drawing Sheets

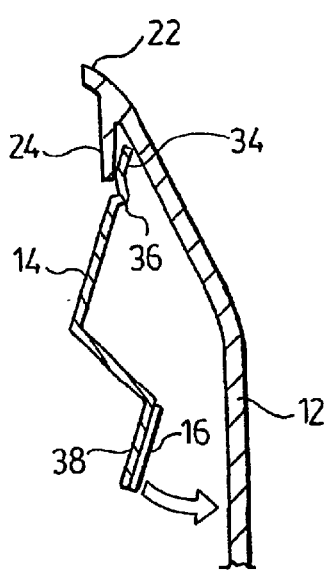
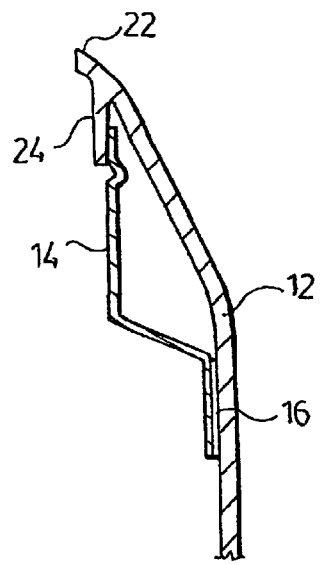
FIG. 2.  FIG. 3.
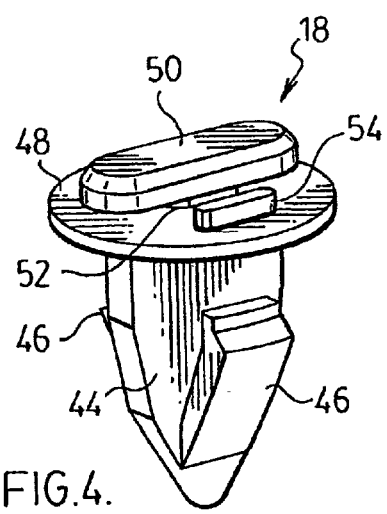
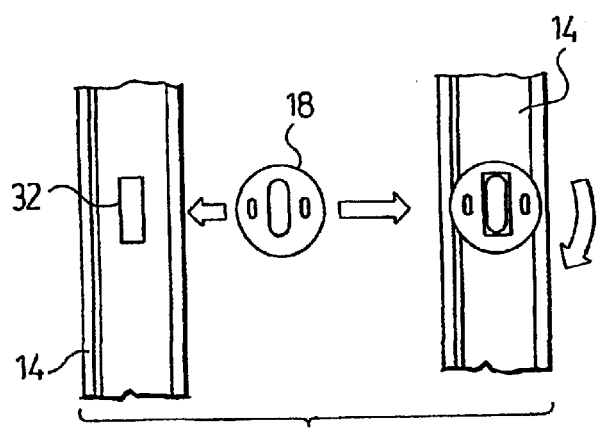
FIG. 4.  FIG. 5.
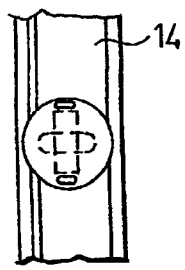
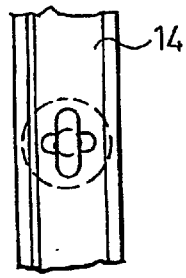
FIG. 6.  FIG. 7.

METHOD OF ATTACHING A CLADDING TO A VEHICLE

FIELD OF INVENTION

This invention relates to a method for attaching cladding and other body panels onto a vehicle.

BACKGROUND OF INVENTION

Plastic outer body panels have become more frequently used over metal body panels. Plastic is advantageous over metal in order to reduce vehicle weight and improve corrosion resistance Additionally, plastic panels are less susceptible to damage from minor impacts.

Attachment of plastic panels to the metal substrate of the vehicle poses several problems. First, plastic and metal are incompatible for welding. Second, plastic panels must be mounted without distortion as such distortion is visible. Third, plastic and metal have different rates of thermal expansion. Fourth, certain plastic panels have relatively high rates of hydroscopic growth in conditions of high humidity.

In U.S. Pat. No. 4,529,244, a plastic body panel is provided with fasteners spaced about the panel. These fasteners allow for relative sliding movement between the panel and the metal substrate. To attach the upper edge of the panel, a plastic reinforcement is attached to the back surface of the panel. The fasteners are retained by the reinforcement. To attach the lower edge of the panel, the fasteners extend through the panel into the substrate, requiring a special tool to close each fastener.

In U.S. Pat. No. 4,973,102, a plastic body panel is provided with fasteners. A special bracket is mounted on the vehicle and the plastic panel is fastened to the bracket. The plastic panel has longitudinal slots which allow relative movement between the plastic panel and the vehicle substrate.

The plastic panel attachment methods of the prior art have not been completely satisfactory. The plastic panels have been know to exhibit a "roping" effect, where the panels sag between the attachment points. In other plastic panels, complicated moldings are required for the fasteners which result in an increase incidence of sink marks on the front face of the panel.

SUMMARY OF THE INVENTION

The disadvantages of the prior art may be overcome by providing a simple method of attaching a plastic panel to a vehicle substrate.

It is desirable to provide a method for attachment of a plastic panel to a vehicle substrate, which method allows to relative expansion of the plastic panel relative to the vehicle substrate.

According to one aspect of the invention, there is provided a mounting method for mounting a plastic panel to a vehicle substrate. There is provided a support flange on an inner surface of the panel. A reference nodule is positioned on the inner surface of the panel. An elongate bracket has an upper edge thereof engaging the support flange. The bracket has a reference notch engaging the reference nodule positioning the bracket relative to the panel. A plurality of retainers is mounted on the bracket. A double-sided adhesive tape has a first adhesive on a first side thereof compatible for adhesion to the bracket and a second adhesive on a second side thereof compatible for adhesion to the panel. The first side of the adhesive tape is applied to the bracket and the second side is applied to the panel. The tape allows expansion and contraction movement of the panel while securely retaining the panel to the vehicle substrate.

According to another aspect of the invention, there is provided a retainer. The retainer has an arrow shaped body having an axial extent and a pair of opposing tangs biased to permit only insertion of the retainer in a complementary aperture. A flange extends from the body and is positioned to limit insertion of the retainer in the complementary aperture. A stud is axially spaced from the flange. The stud has a non-circular shape. A tab extends from the flange towards the stud and is rotationally spaced therefrom. A non-circular aperture is provided on a mounting surface. The aperture is sized to receive the stud, wherein the retainer is mounted by inserting the stud through the non-circular aperture and the retainer is rotated until the tab snappingly engages the noncircular aperture locking the retainer to the mounting surface.

DESCRIPTION OF THE DRAWINGS

In drawing which illustrate embodiments of the present invention,

FIG. 2 is partial side sectional view of a panel and bracket of the present invention with the bracket being applied to the inner surface of the panel;

FIG. 3 is a partial section view of a panel and bracket of the present invention;

FIG. 4 is a perspective view of a retainer of the present invention;

FIGS. 5, 6 and 7 are plane views of the retainer and bracket of the present invention.

DESCRIPTION OF THE INVENTION

Figure 1:
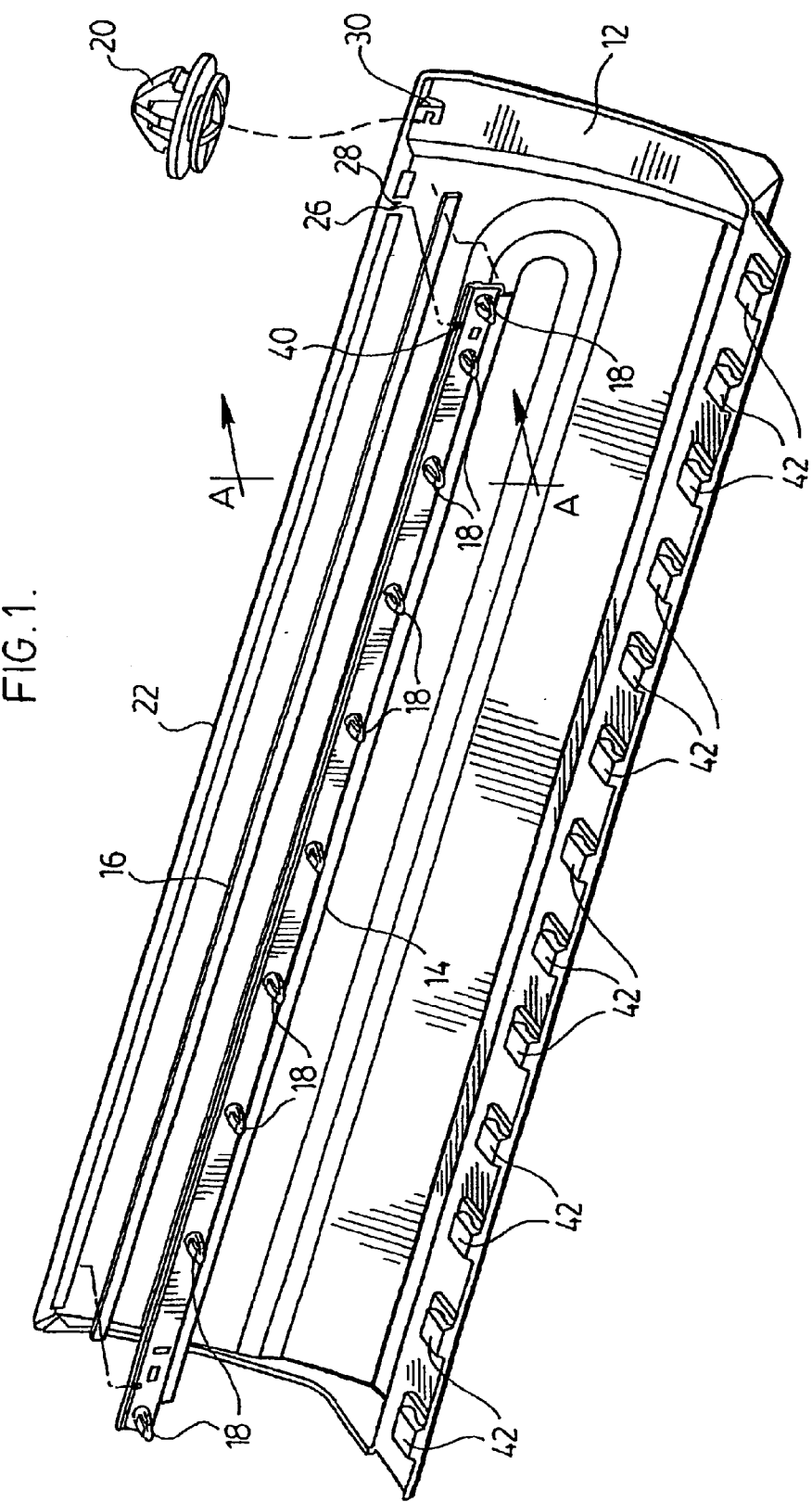
FIG. 1 is an exploded perspective view of a plastic panel with attachment of the present invention.

Referring to FIG. 1, a plastic panel 12 incorporating the attachment method of the present invention is illustrated. Generally, the attachment method comprises a bracket 14, a double sided strip of adhesive tape 16, a plurality of retainers 18 and a secondary retainer 20.

Plastic panel 12 has an outer contour of any desired shaping. Panel 12 can be made of any suitable plastic material, including TPO, PVC, polyurethane, polycarbonate, nylon, SMC (sheet molding compound). Panel 12 has an upper edge 22 having a molded downwardly extending support flange 24 extending longitudinally of the panel 12. The depth and thickness of the flange 24 should be less than the maximum extent allowable to mold without forming sink marks in the outer contoured surface of panel 12. Flange 24 extends substantially the length of panel 12. At one end an opening 26 is preferably provided. A reference nodule 28 is precisely positioned.

Optionally, panel 12 is provided with a dog house 30 having a keyhole for receiving retainer 20. The use of a dog house 30 and retainer 20 provides attachment for regions of the panel 12 having reduced thickness which cannot accommodate the bracket 14.

The lower edge of panel 12 is provided with a series of molded tangs 42 which are configured to clip and secure onto a flange on the substrate of the vehicle.

Bracket 14 is an elongate rigid substrate, preferably of metal or plastic. In the most preferred embodiment, the bracket 14 is a stainless steel. The bracket 14 has stepped contour in cross section as illustrated in FIGS. 2 and 3. The depth of the step depends upon the contour of the panel 12. The bracket 14 has a series of spaced rectangular apertures 32 on a central portion thereof. The number of apertures 32 depends on design criteria. The central portion has an upper edge 34 and a longitudinally extending rib 36. Rib 36 adds structural rigidity to the bracket 14. The lower portion 38 has an elongate surface on which double-sided tape 16 is applied.

Double-sided tape 16 has first surface with an adhesive which is compatible with the bracket 14, which side is applied thereto. The opposite side of tape 16 has an adhesive which is compatible with the plastic material comprising panel 12.

The upper edge 34 has at least one reference notch 40 spaced near an end of the bracket 14. Reference notch 40 is used to align bracket 14 on panel 12 which in turn aligns panel 12 on the vehicle. Preferably, bracket 14 has two notches on opposite ends so that the same bracket can be used on opposite sides of the vehicle.

Bracket 14 can be made using any suitable method. Preferably, the bracket is roll formed and then apertures 32 and notches 40 are punched or stamped. Alternatively, bracket 14 can be stamped in a single operation or successive operations.

Retainer 20 is a conventional "W" base -¼ turn attachment clip, commonly used and commercially available from ITW Plastics.

Referring to FIG. 4, retainer 18 is illustrated in greater detail. Retainer 18 has a flat arrow head shaped body 44 having tangs 46 extending from opposite faces of body 44. A flange 48 extends orthogonally from body 44. A rectangularly shaped stud 50 is mounted on a neck 52 to space the stud 50 from the flange 48. Preferably, neck 52 has a thickness slightly greater than the thickness of the bracket 14. Stud 52 is sized to be received within aperture 32 of bracket 14. A pair of tabs 54 extends from the flange 48 on opposite sides of stud 52. Preferably, the tabs 54 are diametrically spaced 90° relative to the stud 52. Any amount of rotation could be used provided the retainer 18 becomes attached to the bracket 14. The width of the tabs 54 corresponds to the width of apertures 32 and the diametric spacing corresponds to the length of aperture 18. The depth of tabs 54 corresponds with the thickness of bracket 14. Retainer 18 is preferably injection molded from a plastic material, preferably nylon or acetal.

Optionally, retainer 18 can have a sealing flange extending from the body 44 and positioned between the flange 48 and the ends of tangs 46.

FIGS. 5, 6 and 7 illustrate the method of installing retainer 18. To install the retainers 18, the stud 50 is aligned with and then inserted through the aperture 32. Flange 48 will flex to accommodate tabs 54. The retainer is then rotated a ¼ turn until the tabs 54 snap into engagement with the aperture 32. Once the tabs 54 have snapped into place, the retainers 18 are substantially secured to the bracket 14. A desired number of retainers 18 are attached to the bracket 14 is a similar fashion. As it is now apparent to those skilled in the art, retainers 18 could be installed before or after the bracket 14 has been applied to the panel 12.

In the preferred embodiment, the bracket 14 will have the double-sided adhesive tape 16 applied to portion 38. The exposed side of the tape 16 will have a removable film covering the adhesive. When the bracket 14 is ready to be applied to the panel 12, the operator removes the film and then inserts the edge 34 under flange 24, aligns the reference notch 40 with the reference nodule 28, rotates the bracket until the tape 16 adheres to the panel 12.

The substrate of the vehicle has a series of apertures corresponding with the positions of the retainer 18. The bottom edge of the panel 12 is applied to a lower flange thereby catching tabs 42 thereon. The retainers 18 are then inserted through the apertures on the vehicle substrate until the tangs 46 snap into place.

The flange 24 will rest upon the bracket 14 along the length thereof. Thus, the upper edge 22 of the panel 12 will be fully supported and will not suffer from the "roping" effect. Further, the panel 12 is adhesively connected with the bracket 14. Expansion and contraction of the panel 12 will be accommodated by the tape 16 and is not dependent upon the retainer 18 moving relative to the vehicle substrate. The panel 12 is thus able to move relative to the vehicle substrate anywhere along its length except for the reference nodule.

The invention has been described in an illustrative manner, and it is to be understood that the terminology which has been used is intended to be in the nature of words of description rather than of limitation. Many modifications and variations of the present invention are possible in light of the above teachings. It is, therefore, to be understood that within the scope of the appended claims the invention may be practiced otherwise than as specifically described.

What is claimed:

1. A mounting assembly for mounting a plastic panel to a vehicle substrate, said mounting means comprising:
    a support flange on an inner surface of said panel,
    an elongate bracket having an upper edge thereof engaging said support flange for supporting said panel,
    a plurality of retainers mounted on said bracket and positioned along said bracket to engage cooperating apertures in said vehicle substrate for attaching the panel thereto, and
    said bracket having a lower edge being adhesively connected to said panel enabling expansion and contraction movement of said panel relative to said bracket.

2. A mounting assembly as claimed in claim 1 further comprising a reference nodule on one of said panel and support bracket, and a reference notch on the other of said panel and support bracket, said reference nodule engaging said reference notch positioning the bracket relative to said panel.

3. A mounting assembly as claimed in claim 2 further comprising a double-sided adhesive tape having a first adhesive on a first side thereof compatible for adhesion to said bracket and a second adhesive on a second side thereof compatible for adhesion to said panel, said double-sided tape adhesively connecting said bracket to said panel.

4. A mounting assembly as claimed in claim 3 wherein said first side is adhered to said bracket and said second side is adhered to said panel.

5. A mounting assembly as claimed in claim 4 wherein said flange downwardly extends from an upper edge of said panel.

6. A mounting assembly as claimed in claim 5 wherein said assembly further comprises at least one dog house on said inner surface and at least one other retainer mounted on said dog house, said retainer positioned to engage a further cooperating aperture in said vehicle substrate.

7. A mounting assembly as claimed in claim 6 wherein said reference nodule is on said panel and said reference notch is on said support bracket.

8. A mounting assembly as claimed in claim 7 wherein said plurality of retainers and further retainer each comprise:
    an arrow shaped body having an axial extent and a pair of opposing tangs biased to permit insertion of the retainer in a complementary aperture, a flange extending from said body and positioned to limit insertion of said retainer in said complementary aperture, a stud axially spaced from said flange having a non-circular shape, at least one tab on said flange extending towards said stud and rotationally spaced therefrom, said bracket having a non-circular aperture sized to receive said stud, wherein said retainer is mounted to said bracket by inserting said stud through said non-circular aperture and rotating said retainer until said tab snappingly engages said non-circular aperture locking said retainer to said bracket.

9. In combination, a vehicle panel comprising a support flange extending longitudinally along an inner edge surface thereof, an elongate support bracket having an upper edge thereof engaging said support flange in a supporting relation with said panel, a plurality of retainers mounted on said bracket and positioned therealong to engage cooperating apertures in a vehicle substrate for attaching the panel to a vehicle, and double-sided adhesive tape having a first adhesive on a first side thereof adhesively connecting a lower edge of said bracket thereto and a second adhesive on a second side thereof adhesively connecting said panel thereto, said double-sided adhesive tape enabling expansion and contraction movement of said panel relative to said bracket.

10. A combination as claimed in claim 9 wherein one of said panel and support bracket has a reference nodule, and the other of said panel and support bracket has a reference notch engaging said reference nodule positioning the bracket relative to said panel.

11. A combination as claimed in claim 10 wherein said panel further comprises at least one dog house on said inner surface and at least one other retainer mounted on said dog house, said retainer positioned to engage a further cooperating aperture in said vehicle substrate.

12. A combination as claimed in claim 11 wherein said reference nodule is on said panel and said reference notch is on said support bracket.

13. A combination as claimed in claim 12 wherein said plurality of retainers and further retainer each comprise:

an arrow shaped body having an axial extent and a pair of opposing tangs biased to permit insertion of the retainer in a complementary aperture, a flange extending from said body and positioned to limit insertion of said retainer in said complementary aperture, a stud axially spaced from said flange having a non-circular shape, at least one tab on said flange extending towards said stud and rotationally spaced therefrom, said bracket having a non-circular aperture sized to receive said stud, wherein said retainer is mounted to said bracket by inserting said stud through said non-circular aperture and rotating said retainer until said tab snappingly engages said non-circular aperture locking said retainer to said bracket.

* * * * *